J. IVES.
Pole-Sweep for Vehicles.
No. 199,911. Patented Feb. 5, 1878.
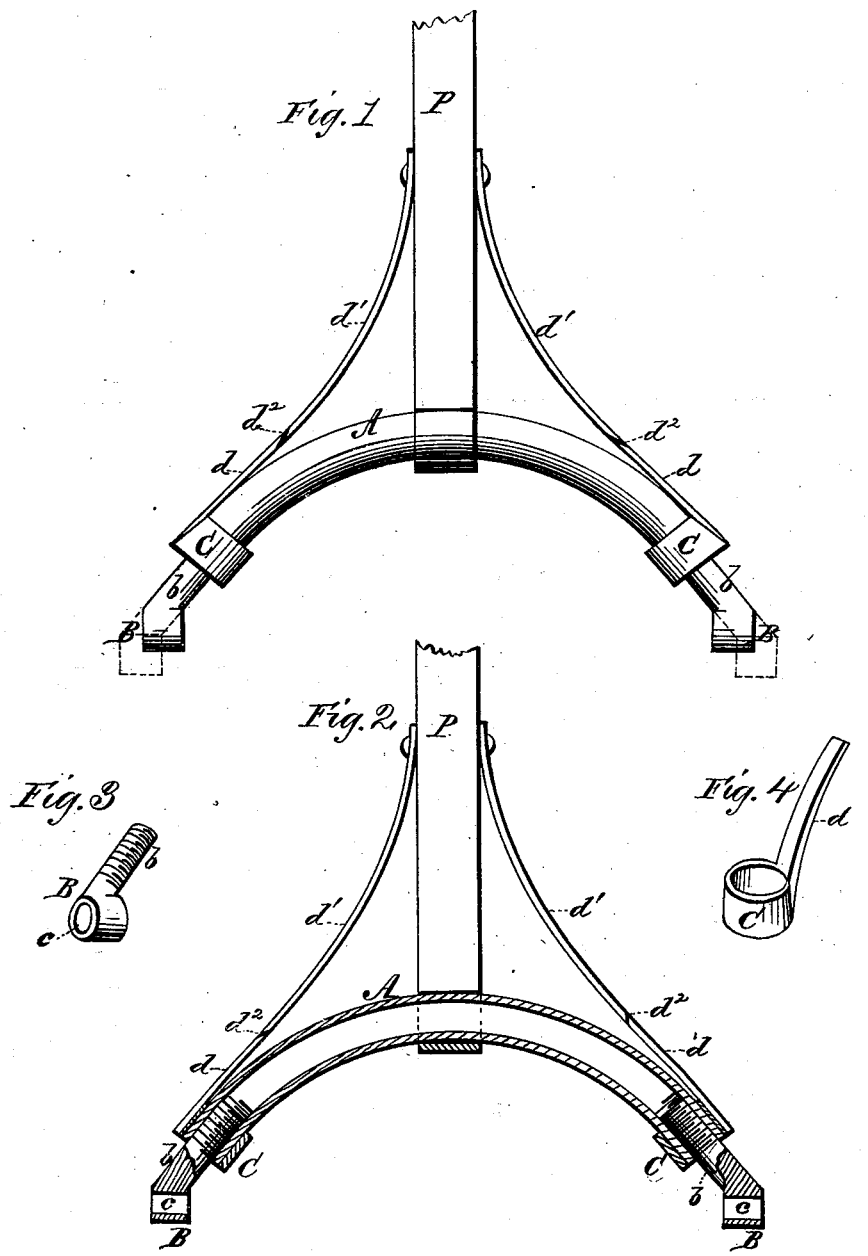
Witnesses.
James Martin Jr
D. P. Cowl
Inventor:
James Ives
by
Mason Fenwick & Lawrence

UNITED STATES PATENT OFFICE.

JAMES IVES, OF MOUNT CARMEL, CONNECTICUT.

IMPROVEMENT IN POLE-SWEEPS FOR VEHICLES.

Specification forming part of Letters Patent No. 199,911, dated February 5, 1878; application filed October 12, 1877.

*To all whom it may concern:*

Be it known that I, JAMES IVES, of Mount Carmel, in the county of New Haven and State of Connecticut, have invented a new and useful Pole-Sweep for Vehicles; and I do hereby declare that the following is a full, clear, and exact description of the same, reference being had to the accompanying drawing.

The nature of my invention consists in certain construction, combination, and arrangement of parts, as hereinafter described, and specifically claimed.

I construct my sweep as follows: A piece of metal tube, A, is bent to a suitable form, as indicated in Figures 1 and 2 of the drawing. A thread is cut inside of each end of the body A of the sweep. A screw, $b$, is cut upon the shank of the pole-eyes to fit into the tube.

Fig. 3 is a detached view of a pole-eye, B, the same being made of metal and with a screw, $b$, cut upon its shank, and with a bolt-hole, $c$, to receive the bolt of the axle-coupling. These pole-eyes are attached to the tube A by screwing their shanks into the tube, as indicated in Figs. 1 and 2, and by the operation of the screws $b$ upon said shanks, the dimensions of the ends of the sweep are adjusted to any point required, while at the same time the true line of the pole-eyes is preserved whether the pole-eyes are in position, as shown in full lines in Figs. 1 and 2, or extended outwardly, as indicated in dotted lines in Fig. 1.

It will thus be seen that my pole-sweep is readily adapted for attachment to carriages which do not have the axle-couplings to which the sweep is applied the same distance apart; and, further, that, whether my pole-eyes are screwed once entirely around or more than once around, as the case may be, into the tube A, still their eyes $c$ will properly receive and fit the attaching-bolt of the axle-coupling.

The sweep when applied to the pole (indicated at P) for use is required to be strengthened by braces attached to the pole at proper angles. This is now done in a variety of ways; but my plan is to affix metal ferrules C (shown in detached view, Fig. 4) upon the ends of the sweep, and attach the braces to these ferrules by rivets or by welding, preferably by welding.

The ferrule C may be attached to the tube A either by welding or riveting, or the ferrule may have a screw-threaded portion on its inside, and the tubular sweep A a screw-thread on its outside, so that the ferrule may be screwed upon the ends of the sweep, if desired.

In Fig. 4, $d$ indicates a section of a brace so attached, and $d^1$ an extended section welded onto $d$ at the heavy black line $d^2$ just previous to applying my sweep to its pole P, my design being to furnish "the trade" and put upon the market a complete sweep with the exception of the sections $d^1$, which sections can readily be applied by an ordinary blacksmith.

Having now described my invention, what I claim as new, and desire to secure by Letters Patent, is—

The arched tubular sweep having the carriage-pole attached centrally to it, and provided with screw-threads in its ends, in combination with eyes B $c$, having tangs which are set oblique with respect to the eyes, so as to coincide with the curved form of the sweep, and are provided with screw-threads $b$ on their inner ends, the said screw-threaded portions of the sweep being bound by collars attached to braces, all substantially as and for the purpose set forth.

Witness my hand, in the matter of my application for a patent on a tubular pole-sweep for vehicles, this 8th day of October, 1877.

JAMES IVES.

Witnesses:
   A. B. JACOCKS,
   GEO. E. NETTLETON.